United States Patent
Gray et al.

(10) Patent No.: US 8,362,704 B2
(45) Date of Patent: Jan. 29, 2013

(54) CAPACITANCE REDUCING METHOD FOR A PULSED ACTIVATED DEVICE AND ASSOCIATED DEVICES

(75) Inventors: Richard Landry Gray, Saratoga, CA (US); Po Ming Tsai, Taipei (TW)

(73) Assignee: Richard Landry Gray, Saratoga, CA (US)

( * ) Notice: Subject to any disclaimer, the term of this patent is extended or adjusted under 35 U.S.C. 154(b) by 374 days.

(21) Appl. No.: 12/770,727

(22) Filed: Apr. 30, 2010

(65) Prior Publication Data

US 2010/0283403 A1 Nov. 11, 2010

Related U.S. Application Data

(60) Provisional application No. 61/176,875, filed on May 8, 2009.

(51) Int. Cl.
*H05B 37/00* (2006.01)
(52) U.S. Cl. ............... 315/209 R; 315/297; 315/308
(58) Field of Classification Search .............. 315/119, 315/125, 127, 128, 177, 186, 193, 200 R, 315/206, 209 R, 219, 224, 225, 276, 283, 287, 291, 297, 299, 306, 307, 360, 362
See application file for complete search history.

(56) References Cited

U.S. PATENT DOCUMENTS

| 7,365,499 B2* | 4/2008 | Nerone et al. ............... 315/247 |
| 2011/0133655 A1* | 6/2011 | Recker et al. ............... 315/159 |

\* cited by examiner

*Primary Examiner* — Douglas W Owens
*Assistant Examiner* — Jianzi Chen

(57) ABSTRACT

The present invention relates to a capacitance reducing method for a pulsed activated device and associated devices, especially to a pulsed activated device having a capacitor, which improves power factor as well as eliminating the need for large capacitance. The method comprises acts of rectifying an AC voltage to a pulsating DC voltage, sensing a zero-crossing point of the pulsating DC voltage, synchronizing the pulsating DC voltage, setting pulse duration in a pulse period and turning ON and OFF of a pulsed activated device. The device comprises a load, a rectifier, a capacitor, a driver, a controller and an optional PFC circuit.

14 Claims, 8 Drawing Sheets

CAPACITANCE REDUCING METHOD FOR A PULSED ACTIVATED DEVICE AND ASSOCIATED DEVICES

FIELD OF THE INVENTION

The present invention relates to a capacitance reducing method for a pulsed activated device and associated devices, especially to a pulsed activated device having a capacitor, which improves power factor as well as eliminates the need for large capacitance.

BACKGROUND OF THE INVENTION

Many electronic devices currently use power factor correction (PFC) circuitry in electric transmission to reduce transmission losses and improve voltage regulation at the load.

With reference to FIG. 1, a conventional electronic ballast with a PFC capability generally has a ground (GND), a load (14), a bridge rectifier (11), a PFC circuit (12) and an inverter (13).

The load (14) may be a cold cathode fluorescent lamp (CCFL) or another type of compact fluorescent lamp (CFL).

The bridge rectifier (11) is connected to an external alternating current (AC) power source (10) (i.e. a line voltage used in a house), rectifies an AC voltage to a full-wave rectified voltage and may be implemented with four diodes.

The PFC circuit (12) improves the power factor of a light fixture and is designed generally in a boost topology to output a high direct current (DC) voltage, commonly 400 volts, and comprises a filter inductor (121), a flyback diode (122), a filter capacitor (123), a switch (120) and a PFC controller (124).

The filter inductor (121) resists changes in current and has an input end and an output end. The input end of the filter inductor (121) is connected to the bridge rectifier (11).

The flyback diode (122) conducts current in only one direction and has an anode and a cathode. The anode of the flyback diode (122) is connected to the output end of the filter inductor (121).

The filter capacitor (123) has a positive terminal and a negative terminal, is mounted between the cathode of the flyback diode (122) and ground (GND) and provides a route to ground (GND) for any alternating component in the direct current. The positive terminal of the filter capacitor (123) is connected to the cathode of the flyback diode (122). The negative terminal of the filter capacitor (123) is connected to ground (GND).

The switch (120) controls loops of the PFC circuit (12) and has two ends. One end of the switch (120) is connected to the filter inductor (121) and the flyback diode (122). The other end of the switch (120) is connected to ground (GND).

The loops are controlled by the switch (120) and comprise an ON-state loop (100) and an OFF-state loop (101).

The ON-state loop (100) is formed between the filter inductor (121) and ground (GND) when the switch (120) is closed.

The OFF-state loop (101) is formed from the filter inductor (121) through the flyback diode (122) to the filter capacitor (123) when the switch (120) is open, which charges the filter capacitor (123).

The PFC controller (124) generates a control signal to control the switch (120), which changes the relative phase between voltage and current of voltage source (10).

In this example the inverter (13) is a DC to AC converter that coverts DC voltage from the PFC circuit (12) to AC voltage that drives the load (14).

With further reference to FIG. 2, a ripple voltage (20) occurs when the full-wave rectified voltage (coming from the bridge rectifier (11)) approaches zero volts. The filter capacitor (123) of the PFC circuit (12) must have enough capacitance to supply sufficient energy to the inverter (13) to drive the load (14) during these times of low input line voltage A filter capacitor (123) used in the conventional PFC circuit has a large capacitance and is usually an electrolytic type capacitor. The electrolytic type capacitor has a benefit of a high capacitance, can withstand high voltages and is reasonably priced for many applications.

Since the electrolytic type capacitor is composed of some type of liquid, one major drawback of the electrolytic type capacitor is its limited lifetime. The liquid will dry out over time, especially in a high temperature environment (often found in lighting applications) that significantly accelerates reduction of lifetime (the life time of the electrolytic type capacitor will reduce 50% for every 10 degrees C. of temperature increase). Generally, lifetime of an electrolytic type capacitor is 2,000 to 8,000 hours, but the lifetime of a CCFL is more than 50,000 hours.

Other capacitor technologies exist, in particular a Mylar capacitor, which has a longer lifetime and good performance for lighting applications. Unfortunately Mylar capacitors are much more expensive than the electrolytic type capacitor and 20 times larger than the electrolytic type capacitor with similar capacitance.

However, people skilled in art know that not only electronic devices using PFC circuitry have a filter capacitor. Other types of devices that can be controlled by pulsed signals may also have a filter capacitor. Therefore, all manufactures and designers are eager to lower the value/size of the filter capacitor so that it may be replaced with a long life capacitor in order to reduce manufacturing costs and increase the lifetime of their products.

SUMMARY OF THE INVENTION

The present invention has two objectives. The first objective of the present invention is to provide a capacitance reducing method for a pulsed activated device and associated devices, especially to a pulsed activated device having a capacitor, which improves power factor as well as eliminates the need for large capacitance.

The second objective of the present invention is to provide lighting devices with good power factor efficiency and smaller capacitance.

A capacitance reducing method for a pulsed activated device in accordance with the present invention comprises acts of rectifying an AC voltage to a pulsating DC voltage, sensing a zero-crossing point of the pulsating DC voltage, synchronizing the pulsating DC voltage, setting pulse duration in a pulse period and turning ON and OFF of the pulsed activated device.

A device in accordance with the present invention can be a ballast, a charger or any other pulsed activated device, which at least comprises a load, a rectifier, a capacitor, a driver and a controller. The rectifier rectifies an AC waveform voltage to a pulsating DC waveform voltage. The driver drives the load. The capacitor is connected between the rectifier and the driver, which supplies sufficient energy to the driver to drive the load. The controller is connected between the rectifier and the driver and turns the driver OFF for at least one interval when the pulsating DC waveform voltage approaches zero voltage.

Accordingly, when the controller has turned OFF the driver, charge on the capacitor no longer decays. Voltage on the capacitor remains constant. Thus, the capacitance of the capacitor used in the present invention can be smaller than that of a capacitor in a conventional application.

BRIEF DESCRIPTIONS OF THE DRAWINGS

DETAILED DESCRIPTION OF THE PRESENT INVENTION

Figure 1:
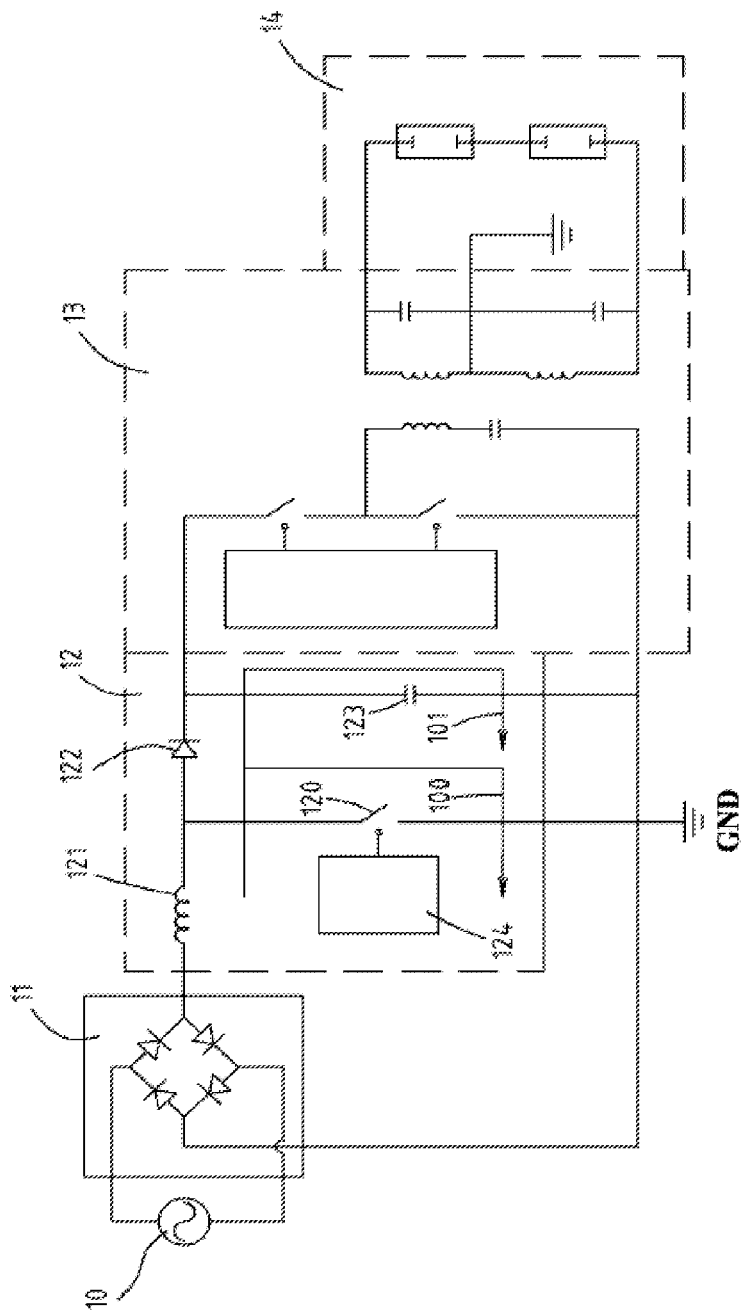
FIG. 1 is a circuit diagram of a conventional cold cathode fluorescent lamp device with a power factor correction (PFC) capability.
Figure 2:
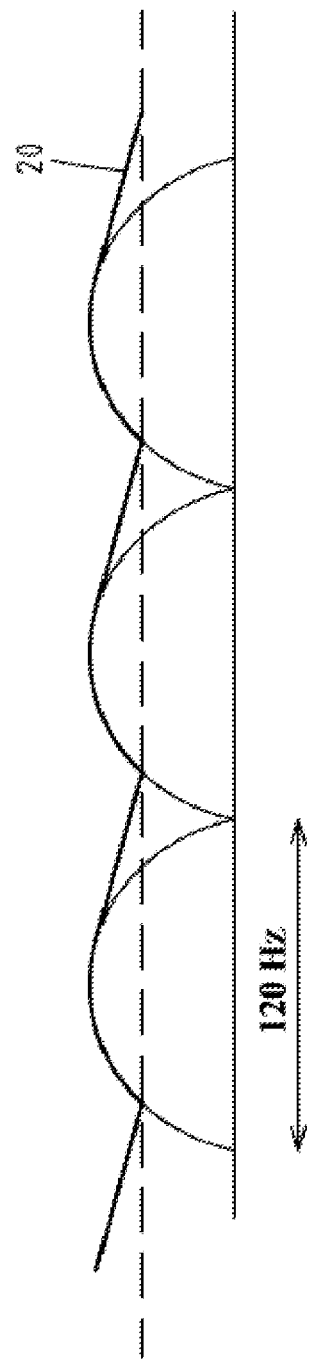
FIG. 2 is a ripple waveform diagram of a full-wave rectified waveform voltage across the capacitor in FIG. 1.
Figure 3:
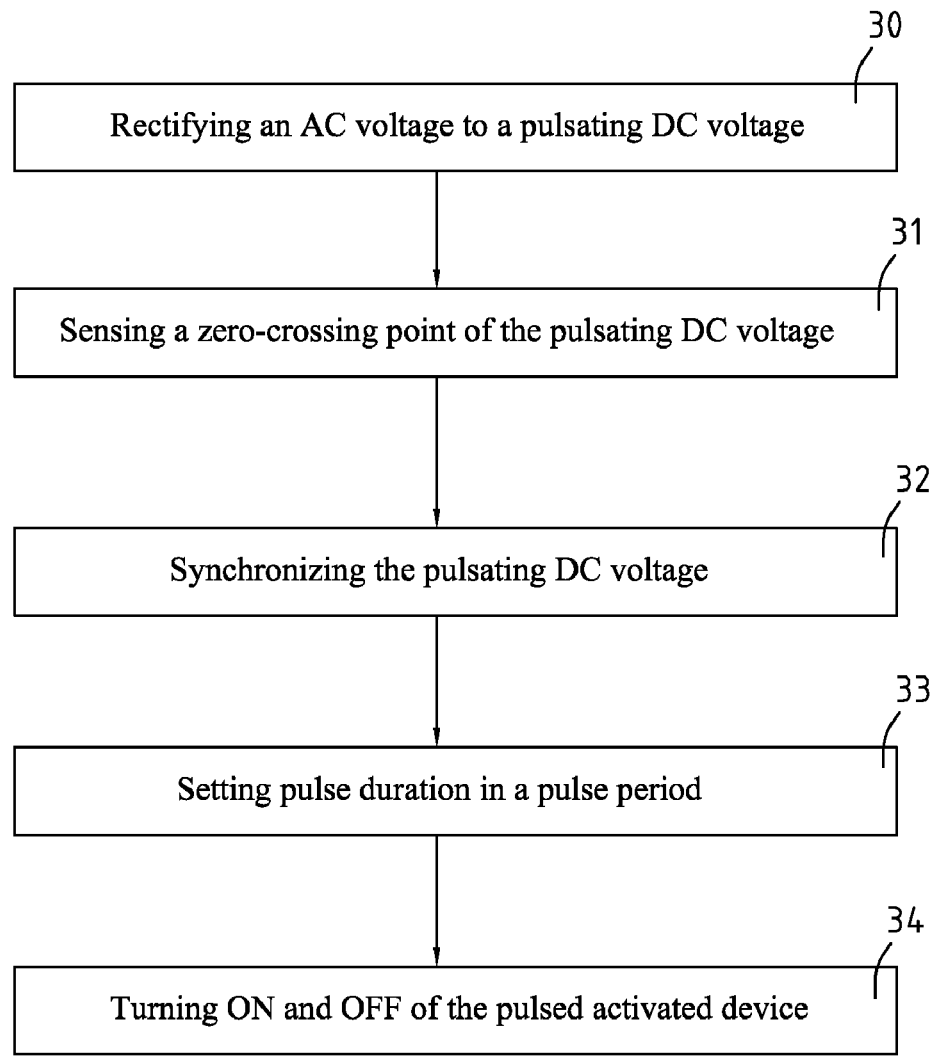
FIG. 3 is a flow diagram of a capacitance reducing method of the present invention.

With reference to FIGS. 3 to 6, a capacitance reducing method for a pulsed activated device in accordance with the present invention comprises acts of rectifying an AC voltage to a pulsating DC voltage (30), sensing a zero-crossing point of the pulsating DC voltage (31), synchronizing the pulsating DC voltage (32), setting pulse duration in a pulse period (33) and turning ON and OFF of a pulsed activated device (34).

The act of rectifying an AC voltage to a pulsating DC voltage (30) rectifies an AC voltage to a pulsating DC voltage (40) and may be implemented using a bridge rectifier connected to an AC power source.

The act of sensing a zero-crossing point of the pulsating DC voltage (31) senses the zero voltage of the pulsating DC voltage (40) and may be implemented using a differential amplifier as a zero-crossing sensor.

The act of synchronizing the pulsating DC voltage (32) synchronizes frequency and phase of a clock signal to the pulsating DC voltage (40) and may be implemented using a phase-locked loop (PLL) circuit. Preferably, the clock signal may be a pulse-width modulation (PWM) signal.

The act of setting pulse duration in a pulse period (33) sets at least one rising time and at least one falling time of the clock signal corresponding to the pulsating DC voltage (40) and may be implemented using a duty cycle selector connected to the phase-locked loop circuit.

The act of turning ON and OFF of the pulsed activated device (34) turns the pulsed activated device ON and OFF for at least one interval corresponding to the clock signal. The interval has an ON time portion and an OFF time portion (41). The OFF time portion (41) may be selected from a group consisting of 10% to 90% of duty cycle.

Accordingly, when the pulsed activated device has been turned OFF, charge on a capacitor of the pulsed activated device no longer decays. Voltage on the capacitor remains constant. Thus, the capacitance of the capacitor used in the pulsed activated device can be successfully reduced since the voltage droop on the capacitor is now less than before.

Figure 4:
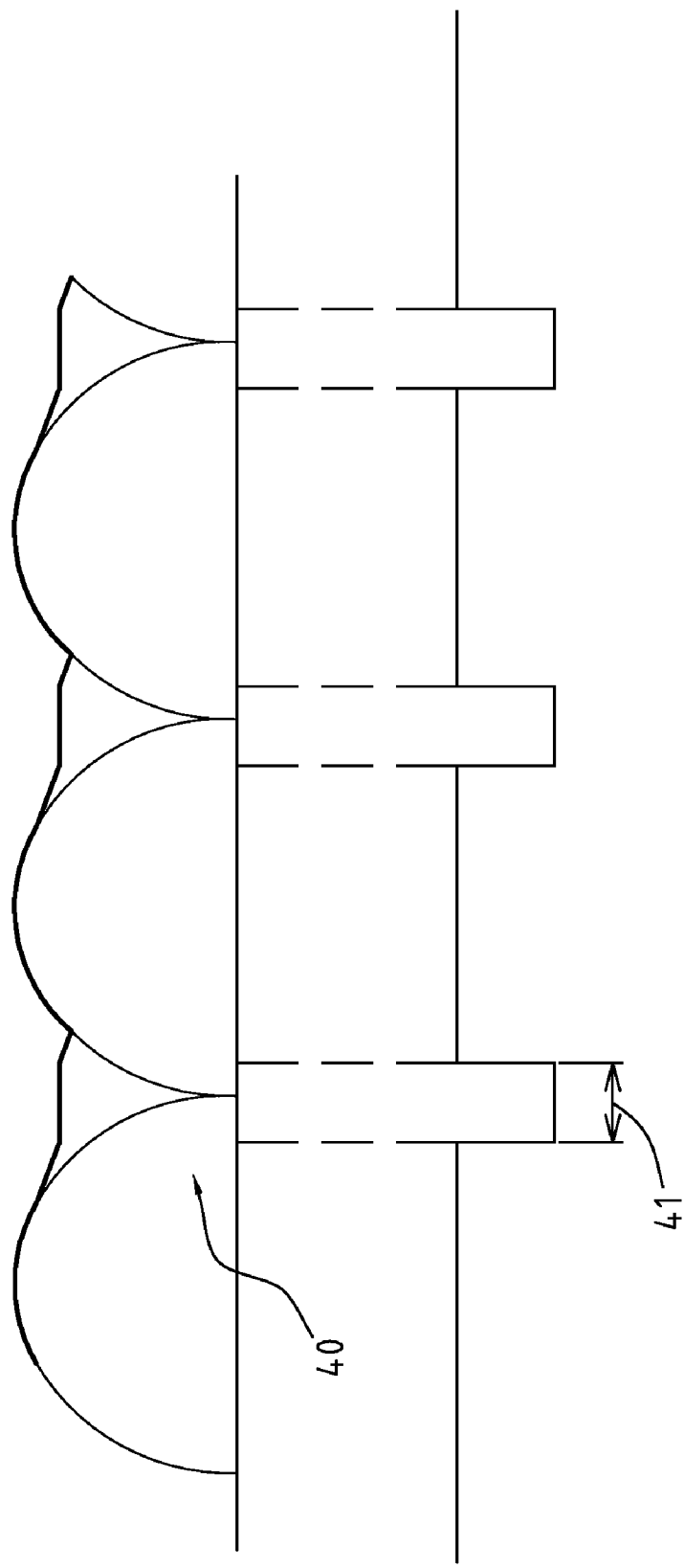
FIG. 4 is a waveform diagram of a pulsating direct current (DC) voltage across the capacitor in FIG. 6, which is modified by a pulse width modulation (PWM) signal with an OFF period per cycle.
Figure 5:
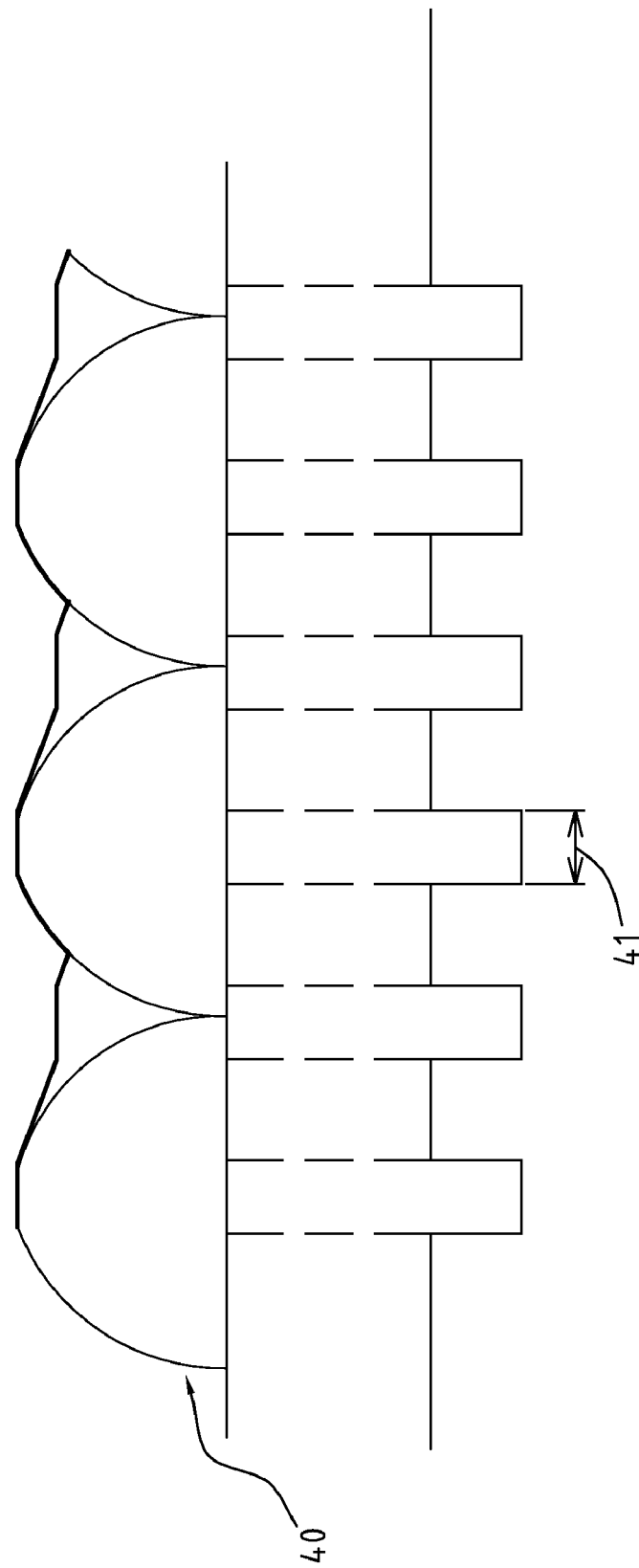
FIG. 5 is a waveform diagram of a pulsating DC voltage across the capacitor in FIG. 6, which is modified by a PWM signal with multiple OFF periods per cycle.
Figure 6:
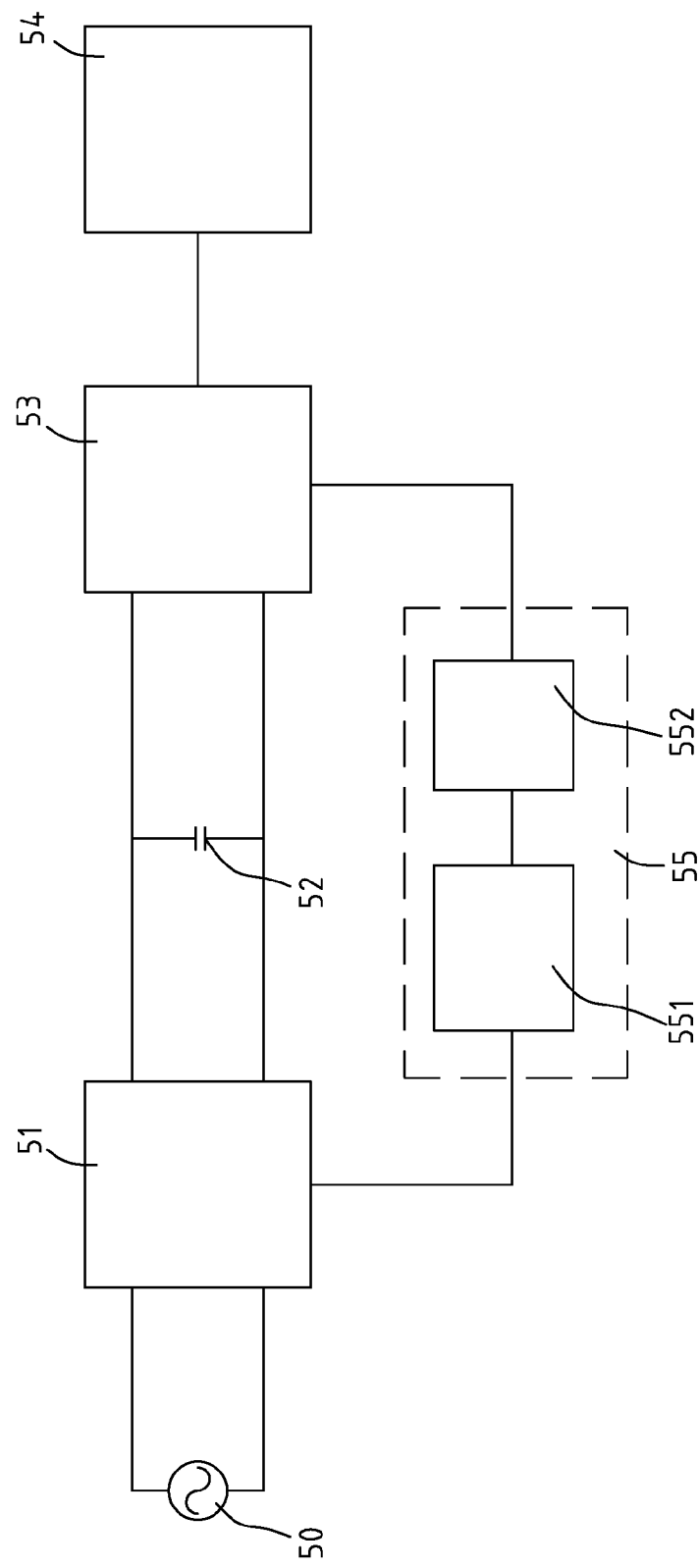
FIG. 6 is diagram of a pulsed activated device in accordance with the present invention.

With reference to FIGS. 4 and 6, the device in accordance with the present invention comprises a load (54), a rectifier (51), a capacitor (52), a driver (53), a controller (55) and an optional power factor correction (PFC) circuit.

The load (54) may be a cold cathode fluorescent lamp (CCFL), an external electrode fluorescent lamp (EEFL), a carbon nanotube lamp (CNL), a light emitting diode (LED) lamp, organic light emitting diode (OLED) lamp or other components that can accept a pulsed supply.

The rectifier (51) is connected to an external AC power source (50) (i.e. a line voltage used in a residence), rectifies an AC voltage to a pulsating DC voltage (40) and may be a full bridge rectifier. The full bridge rectifier may be implemented with four diodes.

The capacitor (52) has a capacitance and is connected to the rectifier (51). The capacitance is a measure of the amount of charge (electrical energy) stored for a given electric potential.

The driver (53) drives the load (54) that, using the charge stored on the capacitor (52), draws current from the capacitor (52). The charge stored in the capacitor (52) decays while current is drawn from the capacitor (52). Decay rate is based on the capacitance of the capacitor (52).

The driver (53) may be an inverter when the load (54) is a fluorescent lamp such as a cold cathode fluorescent lamp (CCFL), an external electrode fluorescent lamp (EEFL) and a carbon nanotube lamp (CNL).

The driver (53) may be a constant current source when the load (54) is an LED lamp.

The driver (53) may be a constant voltage source when the load (54) is an OLED lamp.

The controller (55) is connected between the rectifier (51) and the driver (53), and generates a pulse-width modulation (PWM) signal that turns the driver (53) OFF for at least one interval when the pulsating DC waveform voltage (40) approaches zero voltage.

The controller (55) may be implemented with a phase locked loop (PLL) circuit (551) and a duty cycle selector (552).

The PLL circuit (551) is connected to the rectifier (51), senses frequency and voltage of the pulsating DC voltage (40) and generates a clock signal based on the frequency of the pulsating DC voltage (40).

The duty cycle selector (552) is connected to the PLL circuit (551) and the driver (53), receives the clock signal from the PLL circuit (551) and generates the PWM signal synchronized to the clock signal, which turns ON and turns OFF the driver (53).

The PWM signal has at least one ON time portion and at least one OFF time portion (41). The OFF time portion (41) is commonly selected from a group consisting of 10% to 90% of duty cycle.

However, turning OFF the driver (53) for short periods of time will decrease the light output of a lamp. The longer the OFF time portion (41) is, the less light output. In most substantial cases made by inventors, the preferable OFF time period is 10% to 25% of duty cycle of the PWM signal.

Reduction in light output can be compensated by running the lamp at a higher power level when the driver (53) is ON. This is a particularly good solution when using lighting solutions where the light output is limited by thermal considerations, such as is often the case for LED lamps. Modern lighting technology usually provides brighter light than older lighting technology. Thus, increasing light output over shorter periods of time is not difficult.

Figure 7:
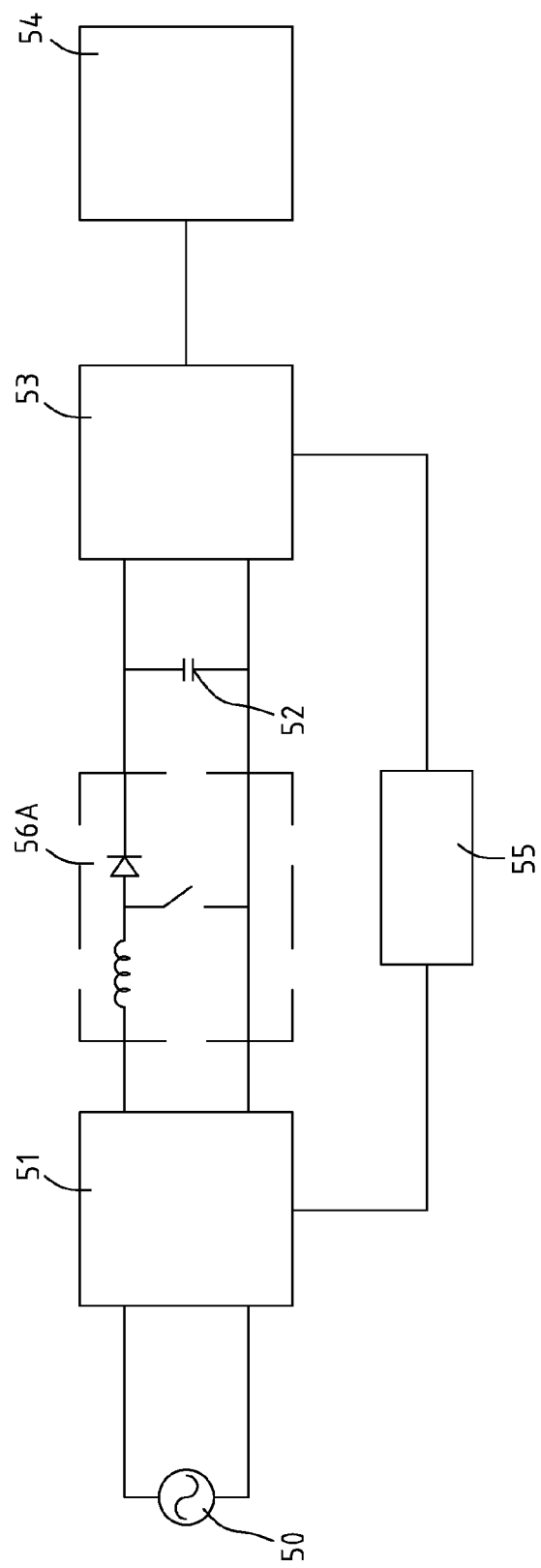
FIG. 7 is a diagram of pulsed activated device with an active PFC circuit in FIG. 6.
Figure 8:
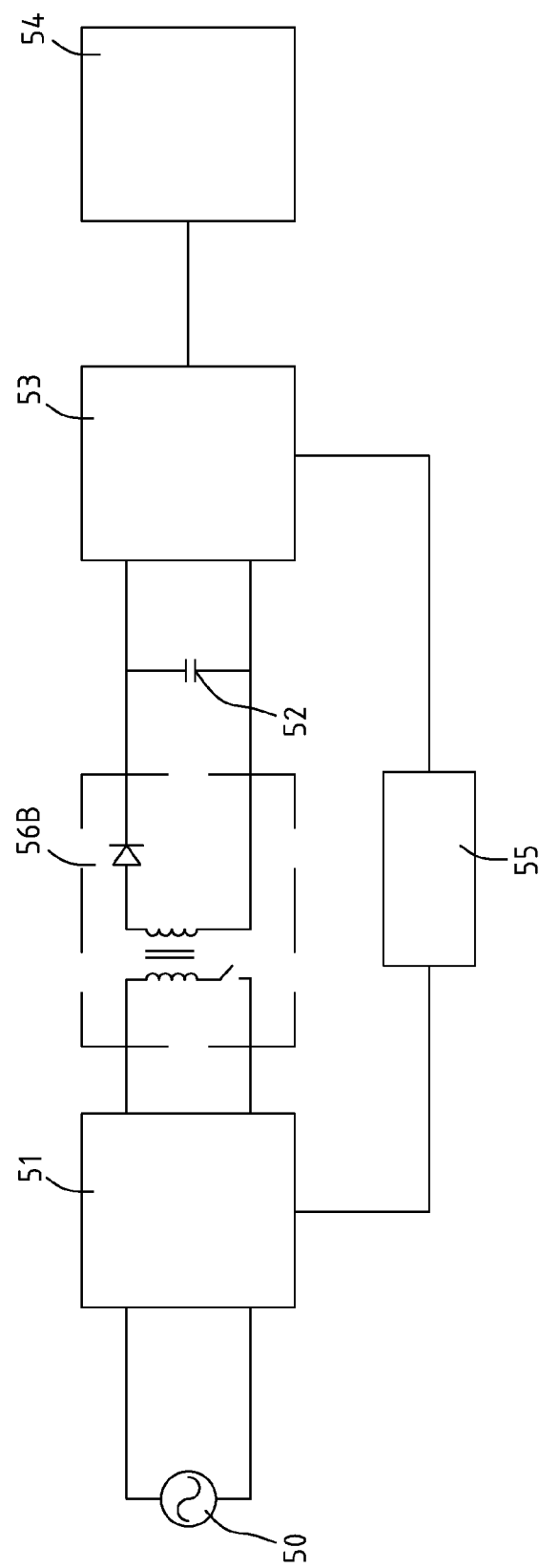
FIG. 8 is a diagram of pulsed activated device with an active PFC circuit that includes voltage isolation in FIG. 6.

With reference to FIGS. 7 and 8, the PFC circuit is connected between the rectifier (51) and capacitor (52) that provides a PFC function to improve power factor of the device.

The PFC circuit may be an active PFC circuit (56A) or an active PFC circuit with voltage isolation (56B). The beneficial capacitor reducing ability of the invention works with or without other PFC circuitry.

Accordingly, when the controller (55) has turned OFF the driver (53), charge on the capacitor (52) no longer decays. Voltage on the capacitor (52) remains constant. Therefore, capacitance of the capacitor (52) in the present invention can be smaller than the capacitor that would be used in a conventional situation because the voltage droop on the capacitor has been reduced.

People skilled in the art will understand that various changes, modifications and alterations in form and details may be made without departing from the spirit and scope of the invention.

What is claimed is:

1. A capacitance reducing method for a pulsed activated device comprising acts of:
   rectifying an AC voltage to a pulsating DC voltage rectifying an AC voltage to a pulsating DC voltage;
   sensing a zero-crossing point of the pulsating DC voltage sensing the zero voltage of the pulsating DC voltage;
   synchronizing the pulsating DC voltage synchronizing frequency and phase of a clock signal to the pulsating DC voltage;
   setting pulse duration in a pulse period setting at least one rising time and at least one falling time of the clock signal corresponding to the pulsating DC voltage; and
   turning ON and OFF of the pulsed activated device turning the pulsed activated device ON and OFF for at least one interval corresponding to the clock signal.

2. The capacitance reducing method for a pulsed activated device as claimed in claim 1, wherein the interval has an ON time portion and an OFF time portion and the OFF time portion is selected from a group consisting of 10% to 90% of duty cycle.

3. The capacitance reducing method for a pulsed activated device as claimed in claim 1, wherein the clock signal is a pulse-width modulation (PWM) signal.

4. A device comprising:
   a load that being accepted with pulse supply;
   a rectifier being connected to an external AC power source, and rectifying an AC voltage to a pulsating DC voltage;
   a capacitor having a capacitance and being connected to the rectifier, wherein the capacitance is a measure of the amount of charge stored for a given electric potential;
   a driver driving the load that using the charge stored on the capacitor that draws current from the capacitor; and
   a controller being connected between the rectifier and the driver, and generating a signal that turns the driver OFF for at least one interval when the pulsating DC waveform voltage approaches zero voltage, wherein the signal is synchronized to the pulsating DC voltage.

5. The device as claimed in claim 4, wherein the rectifier is a full bridge rectifier.

6. The device as claimed in claim 4, wherein the load is a cold cathode fluorescent lamp (CCFL), an external electrode fluorescent lamp (EEFL) or a carbon nanotube lamp (CNL), and the driver is an inverter.

7. The device as claimed in claim 4, wherein the load is a light emitting diode (LED) lamp and the driver is a constant current source.

8. The device as claimed in claim 4, wherein the load is an organic light emitting diode (OLED) lamp and the driver is a constant voltage source.

9. The device as claimed in claim 4, wherein the signal generated by the controller is a pulse-width modulation (PWM) signal to turn the driver OFF and ON.

10. The device as claimed in claim 9, wherein the controller comprises
    a PLL circuit being connected to the rectifier, sensing frequency and voltage of the pulsating DC voltage and generating a clock signal based on the frequency of the pulsating DC voltage; and
    a duty cycle selector being connected to the PLL circuit and the driver, receiving the clock signal from the PLL circuit and generating the PWM signal synchronized to the clock signal, which turns ON and turns OFF the driver.

11. The device as claimed in claim 10, wherein the PWM signal has at least one ON time portion and at least one OFF time portion and the OFF time portion is selected from a group consisting of 10% to 25% of duty cycle.

12. The device as claimed in claim 4, further comprising a power factor correction (PFC) circuit that improves power factor of the device.

13. The device as claimed in claim 12, wherein the PFC is an active PFC circuit.

14. The device as claimed in claim 12, wherein the PFC is an active PFC circuit with voltage isolation.

* * * * *